United States Patent [19]

LeTarte

[11] Patent Number: 4,660,449
[45] Date of Patent: Apr. 28, 1987

[54] STOCK FEEDING APPARATUS

[76] Inventor: Walter G. LeTarte, 2040 Emerson Rd., Goodells, Mich. 48027

[21] Appl. No.: 885,157

[22] Filed: Jul. 11, 1986

[51] Int. Cl.⁴ .......................... B27B 5/18; B27B 27/04
[52] U.S. Cl. ......................................... 83/261; 83/268; 83/282
[58] Field of Search ................. 83/261, 372, 370, 211, 83/282, 268

[56] References Cited

U.S. PATENT DOCUMENTS 2,757,736  8/1956  Middestadt ........................ 83/372 X
3,910,142  10/1975  Jureit et al. ........................ 83/268 X
4,175,458  11/1979  Paris et al. ............................. 83/268

Primary Examiner—Donald R. Schran
Attorney, Agent, or Firm—Basile, Weintraub & Hanlon

[57] ABSTRACT

Feeding apparatus for repetitively advancing an elongate workpiece to a saw cyclically operable to cut parts of uniform length from the workpiece includes a power-driven feed wheel frictionally engageable with the workpiece. The feed wheel is movable into and out of engagement with the workpiece so that the workpiece may be clamped in a stationary position while being cut. The feeding apparatus is provided with a manually controlled adjustment which enables the operator to adjust the feeding apparatus to compensate for wear of the feed wheel with little or no interruption of the production cycle.

4 Claims, 7 Drawing Figures

STOCK FEEDING APPARATUS

BACKGROUND OF THE INVENTION

The present invention is concerned with feeding apparatus employed in conjunction with saws set up to repetitively cut sections of uniform length from an elongate length of stock. A typical application of such an apparatus is the cutting of double-mitered sections subsequently assembled into a picture frame or glass frames for doors or windows.

The formation of a mitered frame requires that the parts which are to form the opposite sides of the frame be cut to precisely the same length. Where such parts are to be produced on a mass-production basis, by cutting the individual parts in succession from an elongate length of stock, production efficiency requires that the stock be fed to the saw rapidly between cuts and held stationary at a precisely regulated position during the cutting operation. The stock is conventionally driven by a feed wheel which frictionally engages the stock. In order to avoid damaging the stock, which may be of wood, plastic, aluminum or other nonferrous metal material, the feed wheel is usually formed of a relatively soft, resilient or rubber-like material which tends to wear quite rapidly in the face of intensive usage. As the wheel wears, its frictional grip upon the stock decreases, eventually to the point where production must be interrupted to adjust or replace the feed wheel.

The present invention is directed to a feeding apparatus of the type referred to above in which the operator may make a feed wheel wear-compensating adjustment to the feeding apparatus with only a momentary production interruption.

SUMMARY OF THE INVENTION

A feeding apparatus embodying the present invention includes a vertically disposed, plate-like guide member fixedly mounted upon the underside of the table along which the stock is fed. A bracket member is located in vertically slidable, face-to-face engagement with the guide member and is coupled to the guide member by bolts which pass through vertically elongate slots in the guide member to retain the bracket in firm, but unclamped, face-to-face engagement with the guide member and to guide the bracket in vertical movement relative to the guide member, and hence the table. A carrier member is similarly mounted upon the bracket for guided, vertical sliding movement relative to the bracket. A fluid pressure motor coupled between the carrier member and the bracket is employed to selectively position the carrier member at either of an elevated or a lowered position upon the bracket.

The bracket threadably receives an elongate bolt which projects from the bracket upwardly through the table and is mounted for rotation in an axially fixed relationship to the table. By appropriate rotation of the bolt, the bracket may be raised or lowered relative to the table.

The feed wheel of the powder-driven feed wheel apparatus is located within an opening in the saw table disposed in the path of feed of the stock to the saw. The bolt threaded into the bracket is initially set so that when the carrier member is positioned by the fluid motor at its elevated position, the feed wheel periphery projects above the table surface in an amount sufficient to frictionally engage and feed a workpiece resting on the table surface. During the cutting operation, the fluid pressure motor is actuated to lower the carrier member to disengage the feed wheel from the workpiece, this latter action being combined with the simultaneous action of fluid pressure operated hold-down devices which will firmly clamp the workpiece to the table during the cutting operation.

When the feed wheel becomes worn to the point where it is no longer properly feeding the stock, the operator simply gives the bolt a slight turn to raise the bracket, and hence the elevated position of the feed wheel apparatus, to increase the frictional grip of the wheel on the stock.

Other objects and features of the invention will become apparent by reference to the following specification and to the drawings.

IN THE DRAWINGS

DESCRIPTION OF THE PREFERRED EMBODIMENT

Figure 1:
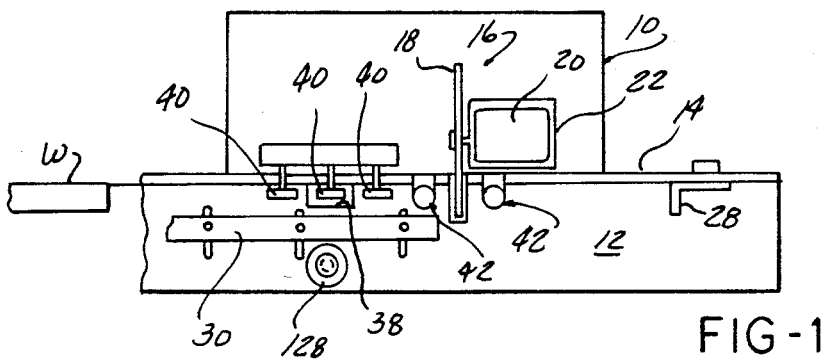
FIG. 1 is a top plan view, with certain parts broken away or omitted, of an exemplary saw apparatus employing the present invention.
Figure 2:
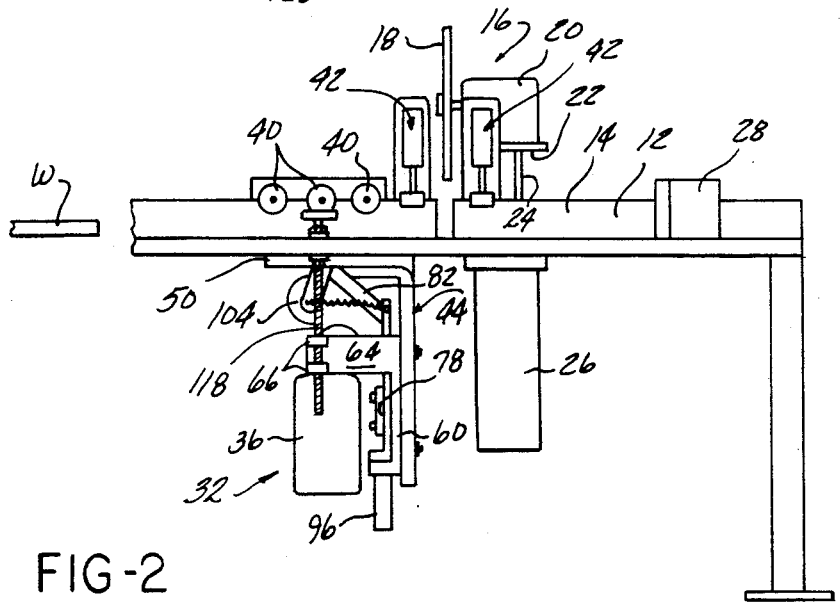
FIG. 2 is a front elevational view, with certain parts broken away, shown in section, and schematically illustrated, of the saw of FIG. 1.

Referring first to FIGS. 1 and 2, there is shown in these figures a simplified top and front view of a saw apparatus employing the feed apparatus of the present invention. The apparatus includes a stationary frame designated generally 10 which includes a horizontally disposed table 12 having a vertically projecting workpiece guiding fence 14 extending along one side of the table.

For simplicity of description, the apparatus of FIGS. 1 and 2 is shown as employing a simple, single cut-off saw designated generally 16 having a circular blade 18 driven in rotation by a motor 20. Motor 20 is shown as mounted on a platform 22 which is in turn mounted at the top of a piston rod 24 of a fluid pressure actuated motor 26 which may be actuated in a well-known manner to vertically reciprocate the saw 16 between an elevated position shown in FIG. 2 and a lowered position to cut through a workpiece located on table 12 and lying against fence 14.

In the arrangement shown, the workpiece may be considered as simply an elongate length of stock which is fed from left to right as viewed in FIG. 2 along the fence 14 on top of table 12 until the end of the stock abuts a stop 28 adjustably positioned along fence 14 to determine the length of the piece which is to be cut from the stock upon lowering movement of saw 16. The stock may further be guided by an adjustable guide 30.

Figure 6:
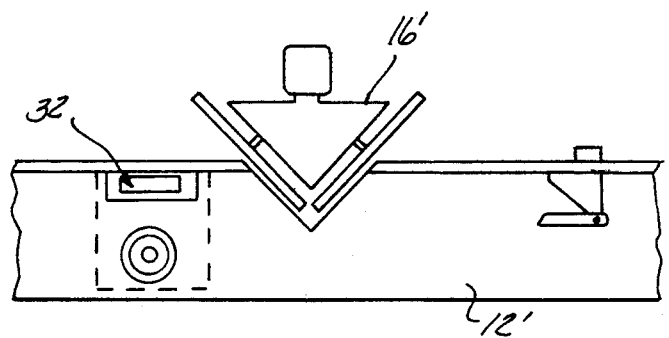
FIG. 6 is a schematic, top plan view of a double-miter saw, with certain parts broken away or omitted, embodying the present invention.

In FIG. 6, a simplified top plan view of a double miter saw is shown (with a conventionally employed safety shield omitted). In this arrangement, the saw 16' is mounted for vertical movement relative to the table 12' in a fashion similar to that employed in FIG. 1. The same feeding apparatus 32, to be described in detail below, is employed in conjunction with the saw of FIG. 6.

The stock is fed across the top of table 12 from left to right as viewed in FIGS. 1 and 2 by a feed apparatus designated generally 32 which embodies the present invention. Feed apparatus 32 includes a feed wheel 34 driven in rotation by a drive motor 36 in a manner to be described more fully below. In FIG. 2, feed wheel feeding apparatus 32 is shown in a lowered position in which the feed wheel lies within an opening 38 through table 12 with the top of the wheel below the top surface of table 12. The feed apparatus 32 is operable, in a manner to be described in greater detail below, to elevate the feed wheel from the position in FIG. 2, to a position in which its periphery projects slightly above the top surface of table 12 to engage the underside of a workpiece supported on the table. A series of guide wheels 40 preferably are located to engage the top of the workpiece to hold it firmly against the elevated feed wheel. The apparatus also preferably includes hold-down devices, such as 42, which may be actuated to clamp the workpiece firmly to table 12 when feed wheel 34 is retracted below the workpiece during the cutting operation.

Figure 3:
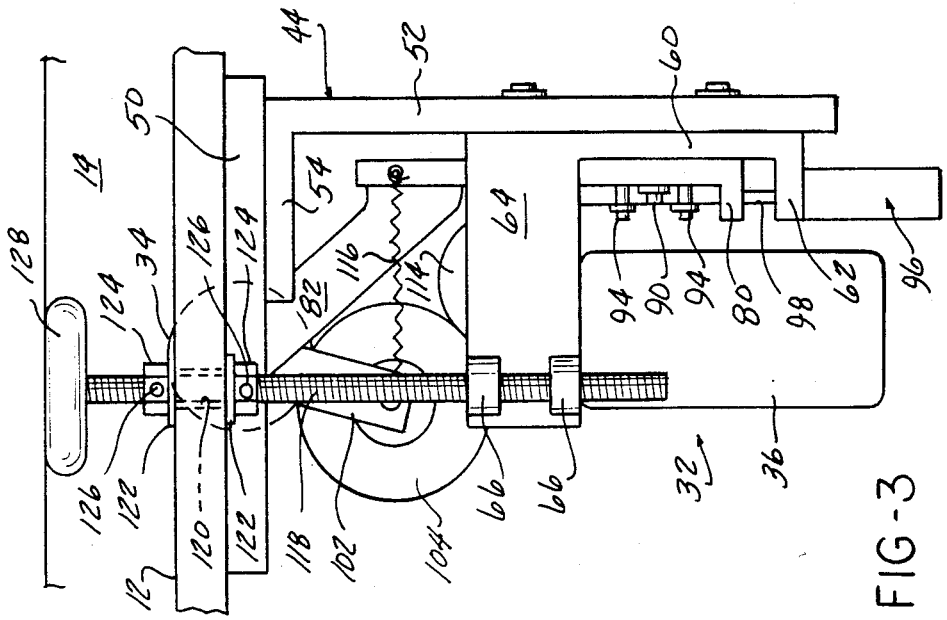
FIG. 3 is a front view of a feed mechanism embodying the present invention as mounted in the saw apparatus of FIGS. 1 and 2, with portions of the saw apparatus broken away.
Figure 4:
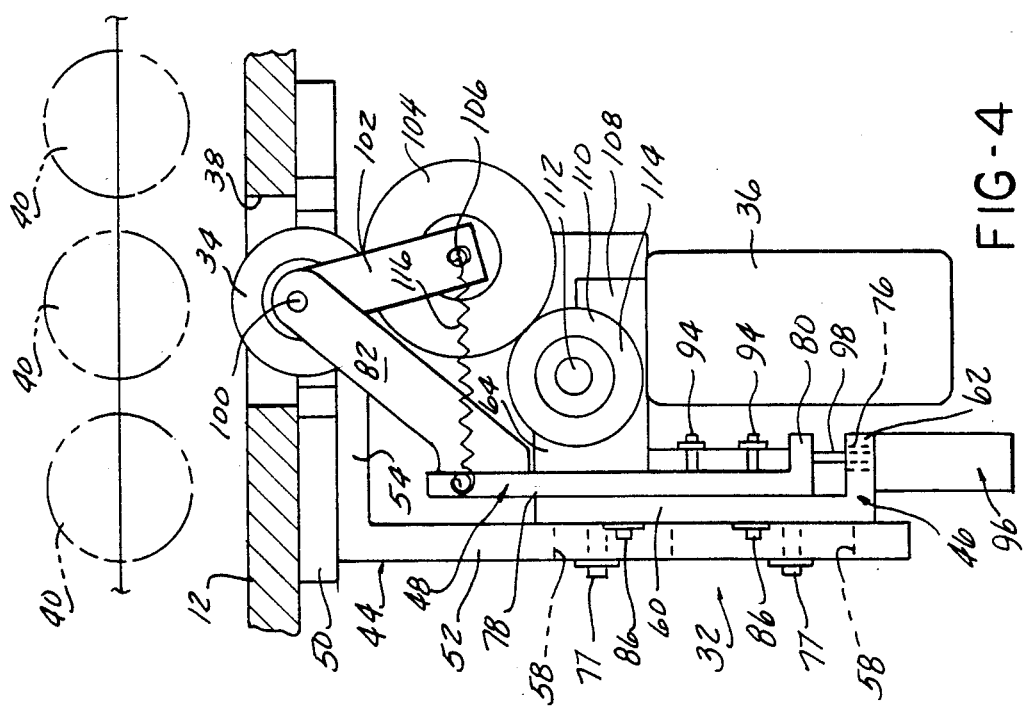
FIG. 4 is a view similar to FIG. 3 showing the rear of the feed apparatus with certain parts of the saw broken away, shown in section, or illustrated in broken line.
Figure 5:
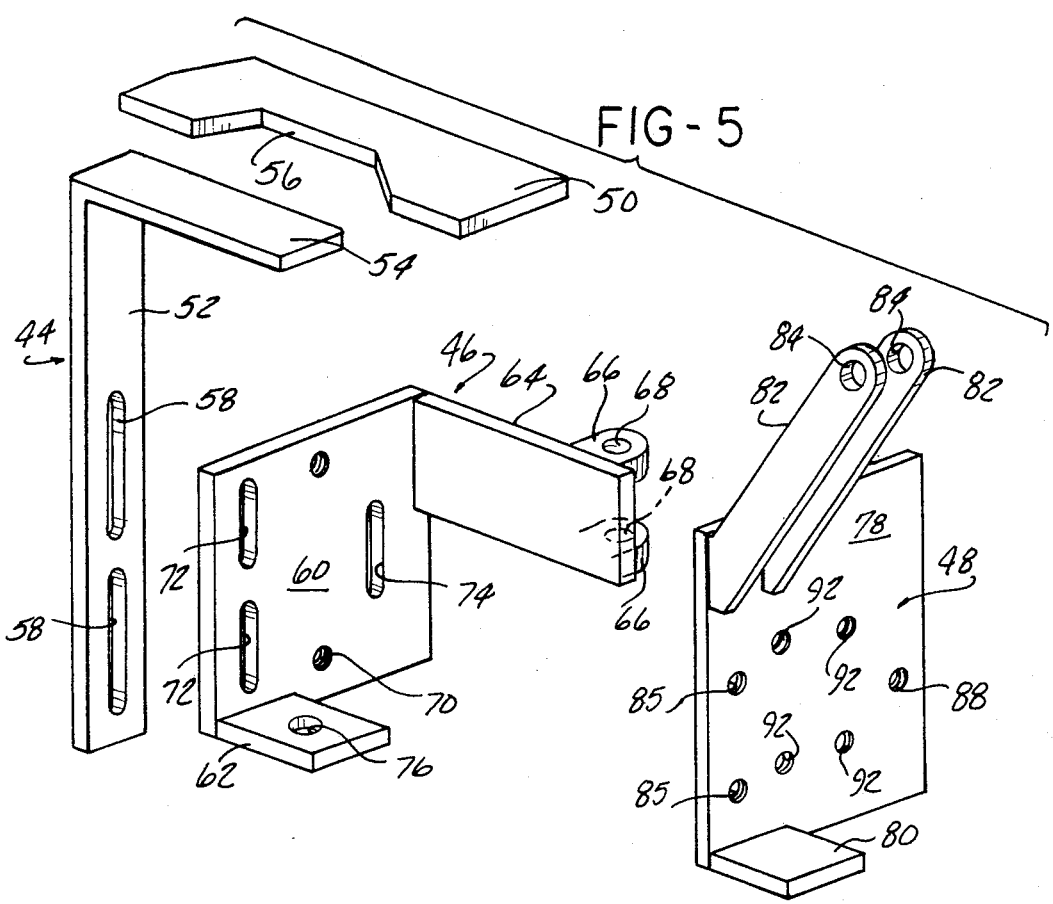
FIG. 5 is an exploded, perspective view of certain parts of the feed mechanism.

Details of the feed apparatus 32 are best seen in FIGS. 3 through 5.

Certain of the parts of the feed apparatus cannot be clearly seen in their entirety in the front and rear views of the assembled apparatus as shown in FIGS. 3 and 4, and reference will therefore be first made to FIG. 5 where various major elements are shown in an exploded perspective view. These elements include a guide member designated generally 44, a bracket member designated generally 46 and a carrier member designated generally 48. A top plate 50, which is fixedly secured to guide plate 44, as by bolts or welding, is shown as a separable member but may, if desired, be formed as an integral part of guide plate 44.

Guide member 44 is formed as an L-shaped member having a flat, plate-like, vertically disposed guide member 52 integrally joined at its upper end to a horizontally projecting leg 54. Top plate 50 is fixedly secured, as by bolts or by welding, to the horizontal leg 54 of guide member 44 and is formed with a recess 56 in one edge which accommodates movement of the feed wheel 34 through the horizontal general plane of plate 50. Vertical guide plate 52 is formed with a pair of vertically elongate slots 58.

Bracket 46 includes a flat, vertically disposed main plate 60 having a horizontally disposed mounting pad 62 projecting forwardly from plate 60 at one end of its lower edge. At the top of the plate 60 at its opposite side, a rigid arm 64 projects horizontally forwardly from plate 60 and carries at its outer end a pair of vertically spaced lugs 66 having vertically aligned threaded bores 68 passing vertically through each lug. Arm 64 is rigidly coupled, as by welding, to plate 60, as is the pad 62. A pair of vertically aligned threaded horizontal bores 70 pass through plate 60 and a pair of vertically elongate slots 72 are located in vertical alignment with each other above pad 62. A third vertically elongate slot 74 passes through plate 60 near the opposite side of the plate, while a smooth bore 76 passes vertically through pad 62.

When the feed apparatus is assembled, as best seen in FIG. 4, bolts 77 (FIG. 4) pass through slots 58 in guide plate 52 and are threadably received in tapped bores 70 of bracket 46 to hold plate 60 of bracket 46 in sliding, face-to-face engagement with guide plate 52 and to enable the vertical slots 58 through plate 52 to guide bracket 46 in vertical movement relative to guide member 44. When so assembled, the slots 72 and 74 in plate 60 of bracket 46 are disposed clear of the opposite vertical side edges of guide plate 52.

Carrier member 48 includes a flat, vertically disposed main plate 78 having a horizontally projecting pad 80 fixedly secured, as by welding, at one end of the lower edge of plate 78. A pair of upwardly inclined arms 82 are fixedly secured, as by welding, to the front side of plate 78 to lie in spaced, parallel, vertical general planes and are formed with aligned shaft-receiving bores 84 near their upper end.

A pair of tapped bores 85 spaced in vertical alignment above pad 80 are located to respectively receive bolts 86 (FIG. 4) which pass through the vertically elongate slots 72 in bracket 46, while a third tapped bore 88 near the opposite side of carrier member 48 similarly receives a bolt, not shown, which passes through slot 74 of bracket 46. These three last-mentioned bolts retain plate 78 of carrier member 48 in sliding, face-to-face engagement with plate 60 of bracket 46 and guide carrier member 48 in vertical movement relative to bracket 46.

A set of four tapped bores 92 in plate 78 receive mounting bolts 94 (FIGS. 3 and 4) which fixedly mount motor 36 upon carrier 48.

When carrier 48 is mounted upon bracket 46, pad 80 of carrier 48 is located in vertical alignment with pad 62 of bracket 46.

Referring now to FIGS. 3 and 4, a pneumatic motor designated generally 96 has its cylinder fixedly mounted on the underside of pad 62 of bracket 46 with its piston rod 98 projecting freely through bore 76 in pad 62 to be fixedly secured to pad 80 of carrier member 48. In FIGS. 3 and 4, the piston rod of motor 96 is shown fully extended which elevates carrier member 48 to an upper end limit of movement relative to bracket 46. When the piston rod 98 of motor 96 is retracted, pad 80 rests upon pad 62 (see FIG. 2) with carrier 48 then located at a lower end limit of movement relative to bracket 46.

Referring now particularly to FIG. 4, feed wheel 34 is mounted for free rotation upon a shaft 100 which passes through bores 84 and is supported by arms 82 of carrier 48. Shaft 100 also pivotally carries, at each side of feed wheel 34, a pair of arms 102 which at their lower end rotatably support an idler wheel 104 upon a shaft 106 mounted in arms 102.

Motor 36 carries at its upper end a gear box 108 whose output shaft 112 carries and drives a drive wheel 114. Idler wheel 104 peripherally frictionally engages both drive wheel 114 and feed wheel 34 to transmit rotary movement of drive wheel 114 to feed wheel 34. Tension springs 116 coupled between arms 102 and plate 78 of carrier member 48 resiliently urge the periphery of idler wheel 104 into contact with the respective peripheries of feed wheel 34 and drive wheel 114.

Referring now particularly to FIG. 3, it is seen that an elongate bolt 118 is threaded through lugs 66 of bracket 46. Bolt 118 passes freely through a bore 120 through table 12 and is coupled to table 12 for free rotation in axially fixed relationship to table 12 by a pair of washers 122 respectively slidably engaged with the upper and lower surfaces of table 12 and held against these surfaces as by nuts 124 threaded on bolt 112 and subsequently pinned as by pins 126 against rotation relative to the bolt. A hand wheel, such as 128, may be fixed to the upper end of the bolt for convenience in manually adjusting the bolt.

When the feed apparatus 32 is assembled and mounted in place beneath table 12, it is set up by first actuating motor 96 to raise carrier 48 to its elevated position relative to bracket 46 as shown in FIG. 2. Hand wheel 128 is then turned until the top of feed wheel 34 projects upwardly through opening 38 in the table by the slight distance necessary to assure firm frictional contact between the periphery of the wheel and the underside of a workpiece resting on the top of table 12.

As the periphery of feed wheel 34 becomes worn through usage to the point where the operator observes a slackening in the feeding action, the operator merely makes a slight adjustment to bolt 118 to raise bracket 46 enough to restore firm, frictional contact between wheel 34 and the workpiece. Because it normally will be necessary only to elevate the wheel by a small distance, the adjustment typically may be made without interrupting production by making a small upward adjustment of the position of bracket 46 between each of a series of feeding cycles until the desired feeding action is restored.

To summarize the setting up of feeding apparatus 32, guide member 44 is fixedly mounted to the saw table to provide a fixed vertical reference plane for vertical movement of the remaining elements of feed apparatus 32. Bracket 46 is adjusted vertically relative to the table by bolt 118 to establish a fixed reference elevation which, as described above, may be readily adjusted. Motor 96 in turn raises and lowers carrier member 48 relative to this fixed reference elevation to selectively move the feed wheel 34 upwardly into frictional engagement with the underside of the workpiece or to lower carrier member 48, and hence feed wheel 34, downwardly out of contact with the workpiece while the workpiece is held stationary on table 12 during the cutting operation.

Figure 7:
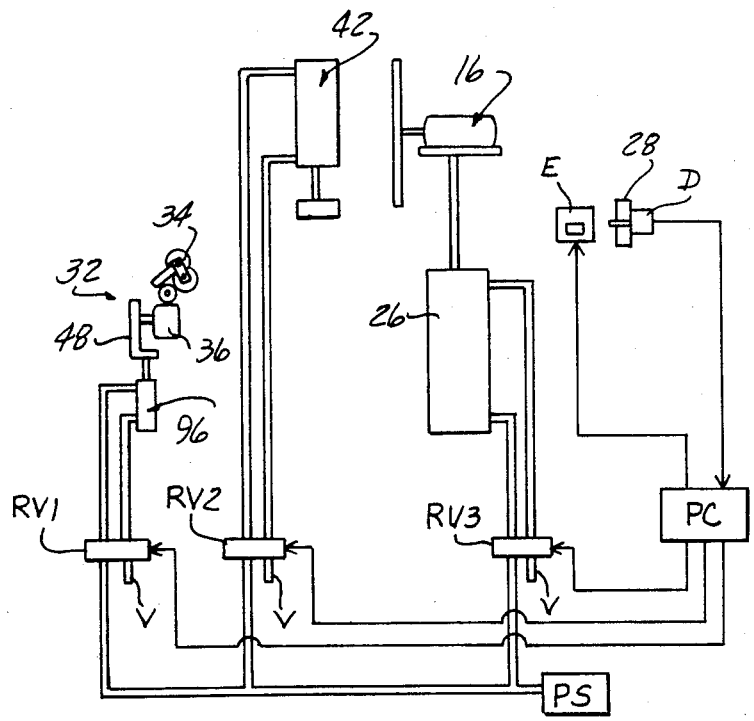
FIG. 7 is a schematic diagram of an exemplary control system employed in conjunction with the feed apparatus of the present invention.

In high-production operations, it is desirable that the operation of the feeding apparatus, hold-down devices and saw be coordinated by a control system. An exemplary form of such a system is disclosed schematically in FIG. 7. A fluid pressure source PS supplies fluid pressure for operating motors 26, 42 and 96, which respectively raise and lower the saw, the hold-down devices or clamps and the carrier member 48. The various motors are connected to pressure source PS via four-way reversing valves RV1, RV2, RV3 as indicated in FIG. 7, each of the reversing valves having a vent port V. The various reversing valves are in turn controlled by a programmable controller PC which may be set up to initiate the performance of a control program upon the receipt of a signal from a detector D mounted upon workpiece stop 28 to detect the location of the end of a workpiece in engagement with stop 28. Programmable controllers suitable for this purpose are commercially available from such companies as Allen Bradley and others.

The control program is so set up that the motor of saw 16 and the feed wheel drive motor 36 operate continuously. As an initial condition, in the absence of a workpiece engaged by stop 28, saw 16 and the various hold-down devices 42 (only one of which is illustrated in FIG. 7) are in their elevated, nonoperative positions clear of the path of movement of the workpiece along the table, and motor 96 of the feed device is actuated with its piston rod fully extended to position feeding apparatus 32 in its operative position in which the feed wheel 34 will engage a workpiece on table 12 to feed the workpiece toward stop 28. Upon the insertion of a workpiece into engagement with feed wheel 34, the workpiece is fed along fence 14 until the end of the workpiece engages stop 28, at which time the detector D sends a cycle initiating signal to the controller PC.

In the first step of the cycle, controller PC signals the reversing valve RV1 to shift positions to cause the piston rod of motor 96 to be retracted, thereby lowering carrier member 48 and feed wheel 34 downwardly out of engagement with the workpiece. Simultaneously, valve RV2 is reversed to actuate the hold-down devices to fixedly clamp the workpiece on the table.

Valve RV3 is then reversed to cause the saw positioning motor 26 to retract its piston rod, lowering the driven saw which, during its lowering movement, cuts and passes through the workpiece to sever that portion of the workpiece between the saw and stop 28 from the remaining portion of the workpiece.

Valve RV3 is then again reversed to cause motor 26 to extend its piston rod to restore the saw to its originally elevated, inoperative position. The saw movement sequence may be controlled either by a timing set up in the programmable controller or suitable detectors responsive to the arrival of the saw at its fully lowered position and at its fully elevated position may be employed to send appropriate signals to the programmable controller.

Valve RV2 will be reversed back to its original position by the controller at some point after the saw has been elevated clear of the workpiece. Usually the apparatus will be provided with a part ejector indicated generally at E which will be actuated by the controller to eject the cut-off end portion of the workpiece.

Valve RV1 will be reversed to its initial position to cause motor 96 to elevate feed wheel 34 back into contact with the remaining portion of the workpiece as soon as the controller has actuated both the hold-down device 42 and the ejector E so that when the workpiece path has been cleared off the cut-off piece, the feed mechanism operates to advance the remaining portion of the workpiece until its end engages stop 28 to actuate detector D to repeat the cycle.

While exemplary embodiments of the invention have been described, it will be apparent to those skilled in the art that the structure specifically described may be modified. Therefore, the foregoing description is to be considered exemplary, rather than limiting, and the true scope of the invention is that defined in the following claims.

I claim:

1. In a saw apparatus for repetitively cutting parts of uniform length from an elongate workpiece, said apparatus comprising a saw table, a workpiece guiding fence mounted on said table, rotary saw means mounted on said table for reciprocatory movement along a fixed path wherein said saw means is operable to cut transversely through an elongate workpiece supported on said table and extending longitudinally along said fence, adjustable stop means mounted on said table at a preselected distance along said fence from said fixed path engageable with the end of an elongate workpiece to establish the length of the part to be cut from said workpiece, and feed means for feeding an elongate workpiece along said fence to advance the end of said workpiece along said fence into engagement with said stop means;

the improvement wherein said table has a feed means accommodating opening therethrough adjacent said fixed path at the side thereof remote from said stop, and said feed means comprises guide means fixedly mounted upon and projecting vertically downwardly from the underside of said table, bracket means slidably mounted upon said guide means for vertical movement relative to said table, positioning means engaged between said table and said bracket means for adjustably locating said bracket means vertically upon said guide means at a selected position below said table, carrier means mounted on said bracket means for vertical sliding movement relative to said bracket means, actuating means engaged between said bracket means and said carrier means for selectively locating said carrier means at either of a lowered position or an elevated position relative to said bracket means, feed wheel means mounted on said carrier means including a power-driven feed wheel located in vertical alignment with said feed means opening in said table and frictionally engageable with the underside of a workpiece when said carrier means is in said elevated position to advance the engaged workpiece toward said stop.

2. The invention defined in claim 1 further comprising fluid pressure actuated workpiece hold-down means located at opposite sides of said fixed path normally disposed in a ready position clear of the path of movement of a workpiece along said fence and operable when actuated to clamp a workpiece against said table, said actuating means comprising a fluid pressure actuated motor, workpiece sensing means at said stop means operable to generate a control signal when the end of a workpiece is engaged with said stop means, and control means responsive to said control signal for operating said actuating means to move said carrier from said elevated position to said lowered position to disengage said feed wheel from said workpiece and to actuate said hold-down means to clamp the workpiece against said table.

3. The invention defined in claim 1 wherein said positioning means comprises elongate threaded bolt means extending vertically through an opening in said table for free rotation within said opening relative to said table in an axially fixed relationship to said table, said bolt means being threadably received in said bracket means to raise or lower said bracket means relative to said table upon rotation of said bolt means.

4. The invention defined in claim 1 wherein said feed wheel means comprises motor means fixedly mounted on said carrier means, a drive wheel driven in rotation by said motor means, means mounting said feed wheel on said carrier means for free rotation about a first axis in spaced relationship to said drive wheel, arm means mounted on said carrier means for pivotal movement about said first axis, an idler wheel mounted for free rotation on said arm in peripheral engagement with said drive wheel and said feed wheel, and spring means biasing said arm means in a direction urging said idler wheel into peripheral engagement with said drive wheel and feed wheel.

* * * * *